July 26, 1932. P. PLANER 1,869,275
PROCESS OF PROJECTING BRIGHT BACKGROUNDS BY OBLIQUE PROJECTIONS
Filed March 28, 1929
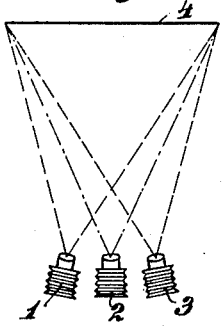
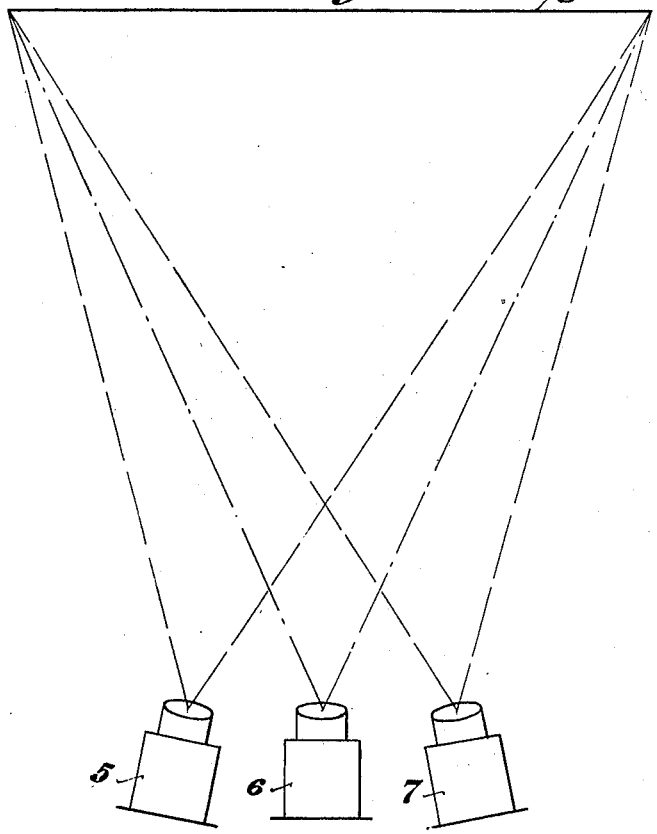

Patented July 26, 1932

1,869,275

UNITED STATES PATENT OFFICE

PAUL PLANER, OF VIENNA, AUSTRIA

PROCESS OF PROJECTING BRIGHT BACKGROUNDS BY OBLIQUE PROJECTIONS

Application filed March 28, 1929, Serial No. 350,736, and in Austria April 7, 1928.

This invention relates to an improved process of projecting bright backgrounds particularly of kinematographic effects.

A process of producing projection pictures or images for oblique projection (particularly for theatres) is already known by which projection images can be produced from models which in the case of like conditions of projection result in images or pictures corresponding exactly with the model.

The luminous intensity of projections is limited and heretofore it has not been possible to produce by projection for instance the large backgrounds for kinematographic objects. The intensity of the source of light as well as also the luminous intensity of the lenses and the heat resistance of the projection image are limited. so that on the projection-screen a light intensity enabling instantaneous photography cannot be produced with a single projection apparatus.

This drawback is removed by the process according to the present invention by making use of the process of producing projection-images or pictures for oblique projection and which consists in making a number of projection pictures corresponding to different positions of the camera with respect to the model to be photographed and to the analogous positions of the projection apparatus with respect to the projection surface, and simultaneously projecting the said projection pictures onto the single surface so that they sufficiently coincide thereon by means of a like number of projection apparatus situated in corresponding positions.

One mode of carrying out the present invention is illustrated diagrammatically by way of example on the accompanying sheet of drawing in which:—

Fig. 1 illustrates the principle of photographing, and

Fig. 2 the principle of projection.

In the camera shown in Fig. 1, the characters 1, 2, 3 designate three lenses and 4 indicates the model or scene to be photographed.

It is clear that, in the event of a large surface for the projection of kinematographic pictures, a large number of projection apparatus 5, 6, 7 are arranged in such a manner, that the images projected by them coincide on the surface or screen 8 in the case of oblique projection, so that the brightness of the picture on the screen, composed of the individual superposed projected images, can be increased according to requirement.

The distances between the individual projection apparatus have to proportionally correspond to the distances between the cameras and the inclined position of each projection apparatus has to exactly correspond to the inclined position of its coordinated camera, so that the angle of the beam of rays of each projection apparatus exactly corresponds to the angle of the beam of rays of the corresponding cameras.

The individual projection pictures can be taken with the same camera from different positions and therefore its size is of no consequence as far as the size of the model is concerned.

The process according to the present invention can be utilized also for producing projection-images or pictures of different character, for instance hard pictures with strong luminous contrasts and soft pictures with clouds or the like, so that the change from sunshine scenery to cloudy scenery or the like can be promoted by gradually disconnecting a part of the projectors during the taking with the kinematographic camera. Of course the process according to the present invention can be used for projecting the backgrounds of stages, advertisements and so forth.

I claim:—

A method of obtaining brilliant backgrounds for cinematographic objects consisting in taking a plurality of groups of distorted photographs of the object from different angles, and subsequently obliquely projecting simultaneously the images of the same group so obtained on to a screen from angles under geometrically similar conditions as those observed during the taking of said photographs, and using a separate projection apparatus for each image, the total of all simultaneously projected images thus resulting in a very brilliant picture.

In testimony whereof I affix my signature.

PAUL PLANER.